(12) United States Patent
Chun (10) Patent No.: US 12,046,772 B2
(45) Date of Patent: Jul. 23, 2024

(54) SECONDARY BATTERY

(71) Applicant: Samsung SDI Co., Ltd., Yongin-si (KR)

(72) Inventor: Byoung Min Chun, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 807 days.

(21) Appl. No.: 16/964,410

(22) PCT Filed: Dec. 20, 2018

(86) PCT No.: PCT/KR2018/016392
§ 371 (c)(1),
(2) Date: Jul. 23, 2020

(87) PCT Pub. No.: WO2019/151646
PCT Pub. Date: Aug. 8, 2019

(65) Prior Publication Data
US 2021/0050571 A1 Feb. 18, 2021

(30) Foreign Application Priority Data
Feb. 1, 2018 (KR) .................. 10-2018-0012755

(51) Int. Cl.
*H01M 10/0525* (2010.01)
*H01M 50/342* (2021.01)
(Continued)

(52) U.S. Cl.
CPC ... *H01M 50/3425* (2021.01); *H01M 10/0525* (2013.01); *H01M 50/574* (2021.01); *H01M 50/578* (2021.01); *H01M 2200/20* (2013.01)

(58) Field of Classification Search
CPC .............................................. H01M 50/3425
See application file for complete search history.

(56) References Cited

U.S. PATENT DOCUMENTS 6,524,739 B1   2/2003  Iwaizono et al.
7,618,745 B2  11/2009  Yamashita et al.
(Continued)

FOREIGN PATENT DOCUMENTS

CN   106920903 A    7/2017
CN   107305964 A   10/2017
(Continued)

OTHER PUBLICATIONS

EPO Extended European Search Report dated Sep. 29, 2021, issued in corresponding European Patent Application No. 18903987.8 (6 pages).

(Continued)

*Primary Examiner* — Osei K Amponsah
(74) *Attorney, Agent, or Firm* — Lewis Roca Rothgerber Christie LLP (57) ABSTRACT

The present invention relates to a secondary battery enabling enhanced safety in case of an external short circuit. According to one example, the secondary battery comprises: an electrode assembly; a case for accommodating the electrode assembly; and a cap assembly coupled to the top of the case. The cap assembly comprises: a cap-up; a safety vent provided below the cap-up; a cap-down provided below the safety vent and having a through hole and a gas discharge hole; an insulator provided between the safety vent and the cap-down; a sub-plate provided below the cap-down; and a solder member for electrically connecting the safety vent and the sub-plate. The safety vent and the sub-plate are electrically connected by means of soldering.

9 Claims, 4 Drawing Sheets

(51) Int. Cl.
*H01M 50/574* (2021.01)
*H01M 50/578* (2021.01)

(56) References Cited

U.S. PATENT DOCUMENTS

| | | | |
|---|---|---|---|
| 9,005,787 B2* | 4/2015 | Kim | H01M 50/3425 429/82 |
| 9,979,057 B2 | 5/2018 | Moon et al. | |
| 10,340,489 B2 | 7/2019 | Ko et al. | |
| 11,075,427 B2 | 7/2021 | Chun | |
| 2007/0172728 A1 | 7/2007 | Yamashita et al. | |
| 2016/0204485 A1 | 7/2016 | Moon et al. | |
| 2017/0187019 A1 | 6/2017 | Chun | |
| 2017/0309879 A1 | 10/2017 | Ko et al. | |

FOREIGN PATENT DOCUMENTS

| | | |
|---|---|---|
| EP | 1 026 761 B1 | 5/2010 |
| EP | 3043400 A1 | 7/2016 |
| JP | 2000100407 * | 4/2000 |
| JP | 2000100407 A * | 4/2000 |
| JP | 2009-170398 A | 7/2009 |
| KR | 10-2007-0077436 A | 7/2007 |
| KR | 10-2012-0103394 A | 9/2012 |
| KR | 10-2013-0025198 A | 3/2013 |
| KR | 10-1249919 B1 | 4/2013 |
| KR | 10-1254174 B1 | 4/2013 |
| KR | 10-1305459 B1 | 9/2013 |
| KR | 10-2016-0034794 A | 3/2016 |
| KR | 20160029230 * | 3/2016 |
| KR | 20160029230 A * | 3/2016 |
| KR | 20160034794 * | 3/2016 |
| KR | 20160034794 A * | 3/2016 |
| KR | 10-2016-0039836 A | 4/2016 |
| KR | 10-2017-0076203 A | 7/2017 |
| KR | 10-1772266 B1 | 8/2017 |

OTHER PUBLICATIONS

Korean Intellectual Property Office International Search Report for corresponding Korean International Application No. PCT/KR2018/016392, mailed Mar. 25, 2019, 2 pages.
Chinese Office Action for CN Application No. 201880090455.3 dated Apr. 6, 2022, 6 pages.

* cited by examiner

SECONDARY BATTERY

CROSS-REFERENCE TO RELATED APPLICATION(S)

This application is a National Phase Patent Application of International Patent Application Number PCT/KR2018/016392, filed on Dec. 20, 2018, which claims priority of Korean Patent Application No. 10-2018-0012755, filed Feb. 1, 2018. The entire contents of both of which are incorporated herein by reference.

TECHNICAL FIELD

The present invention relates to a secondary battery.

BACKGROUND ART

In general, a cylindrical lithium ion secondary battery generally includes a cylindrical electrode assembly, a cylindrical case coupled to the electrode assembly, an electrolyte injected into the case to allow movement of lithium ions, and a cap assembly coupled to one side of the case to prevent leakage of the electrolyte and separation of the electrode assembly. In addition, a current interrupt device (CID) capable of interrupting the flow of current when abnormality occurs to the secondary battery is provided in the cap assembly.

For example, if the secondary battery is overcharged, decomposition of an electrolyte may occur due to discharge gases, such as carbon dioxide or carbon monoxide, and thus the internal pressure of the secondary battery may increase. In such a case, the CID of the cap assembly may operate to interrupt the flow of current, thereby preventing ignition or explosion of the secondary battery. However, although the current and component heat are rapidly generated due to an external short circuit, the internal pressure of battery may slowly increase, and thus the CID may not operate properly. In addition, sealing of the cap assembly may be cancelled due to a component damage, obstructing the proper operation of the CID.

DESCRIPTION OF EMBODIMENTS

Technical Problem

The present invention provides a secondary battery enabling enhanced safety in case of an external short circuit.

Solution to Problem

According to an aspect of the present invention, provided is a secondary battery including: an electrode assembly; a case for accommodating the electrode assembly; and a cap assembly coupled to the top of the case, wherein the cap assembly comprises a cap-up, a safety vent provided below the cap-up, a cap-down provided below the safety vent and having a through hole and a gas discharge hole, an insulator provided between the safety vent and the cap-down, a sub-plate provided below the cap-down, and a solder member for electrically connecting the safety vent and the sub-plate, and the safety vent and the sub-plate are electrically connected by means of soldering.

The safety vent may include a fixing portion installed to make close contact with an edge portion of the cap-up, and a deforming portion positioned at an inner side of the fixing portion and downwardly protruding, and the deforming portion may include a first region extending from the fixing portion and having a notch formed therein, and a second region positioned at an inner side of the first region, having a coupling portion having a center hole formed therein, and downwardly protruding.

The sub-plate may include an accommodating groove located to correspond to the through hole of the cap-down, and the coupling portion and the solder member may be accommodated in the accommodating groove.

The accommodating groove may be configured to have a top-end diameter smaller than a bottom-end diameter.

A hook bent toward an outer side of the safety vent may be provided at an end of the coupling portion.

The hook may have a diameter smaller than the top-end diameter of the accommodating groove.

A plurality of coupling holes may be provided in the second region, and the solder member may be injected into the coupling holes.

The solder member may have a melting point ranging from 200° C. to 300° C.

When an external short circuit occurs to the secondary battery, the solder member may be melted and the safety vent may be upwardly convexly deformed, so that the safety vent is disconnected from the sub-plate.

When the internal pressure of the secondary battery is greater than or equal to an operating pressure of the safety vent, the solder member may be melted and the safety vent may be upwardly convexly deformed, so that the safety vent is disconnected from the sub-plate.

Advantageous Effects of Invention

As described above, in the secondary battery according to an embodiment, the safety vent and the sub-plate are electrically connected by means of soldering, and the solder member is melted due to an external short circuit, so that the safety vent is disconnected from the sub-plate, thereby interrupting the current flowing through the secondary battery. Therefore, the secondary battery of the present invention may enable enhanced safety by preventing the electrode assembly from generating heat.

MODE OF INVENTION

Hereinafter, example embodiments of the present invention will be described in detail.

Various embodiments of the present invention may be embodied in many different forms and should not be construed as being limited to the example embodiments set forth herein. Rather, these example embodiments of the invention are provided so that this invention will be thorough and complete and will convey inventive concepts of the invention to those skilled in the art.

In addition, in the accompanying drawings, sizes or thicknesses of various components are exaggerated for brevity and clarity. Like numbers refer to like elements throughout. As used herein, the term "and/or" includes any and all combinations of one or more of the associated listed items.

The terminology used herein is for the purpose of describing particular embodiments only and is not intended to be limiting of the invention. As used herein, the singular forms are intended to include the plural forms as well, unless the context clearly indicates otherwise. It will be further understood that the terms "comprise or include" and/or "comprising or including," when used in this specification, specify the presence of stated features, numbers, steps, operations, elements, and/or components, but do not preclude the presence or addition of one or more other features, numbers, steps, operations, elements, components, and/or groups thereof.

Figure 1:
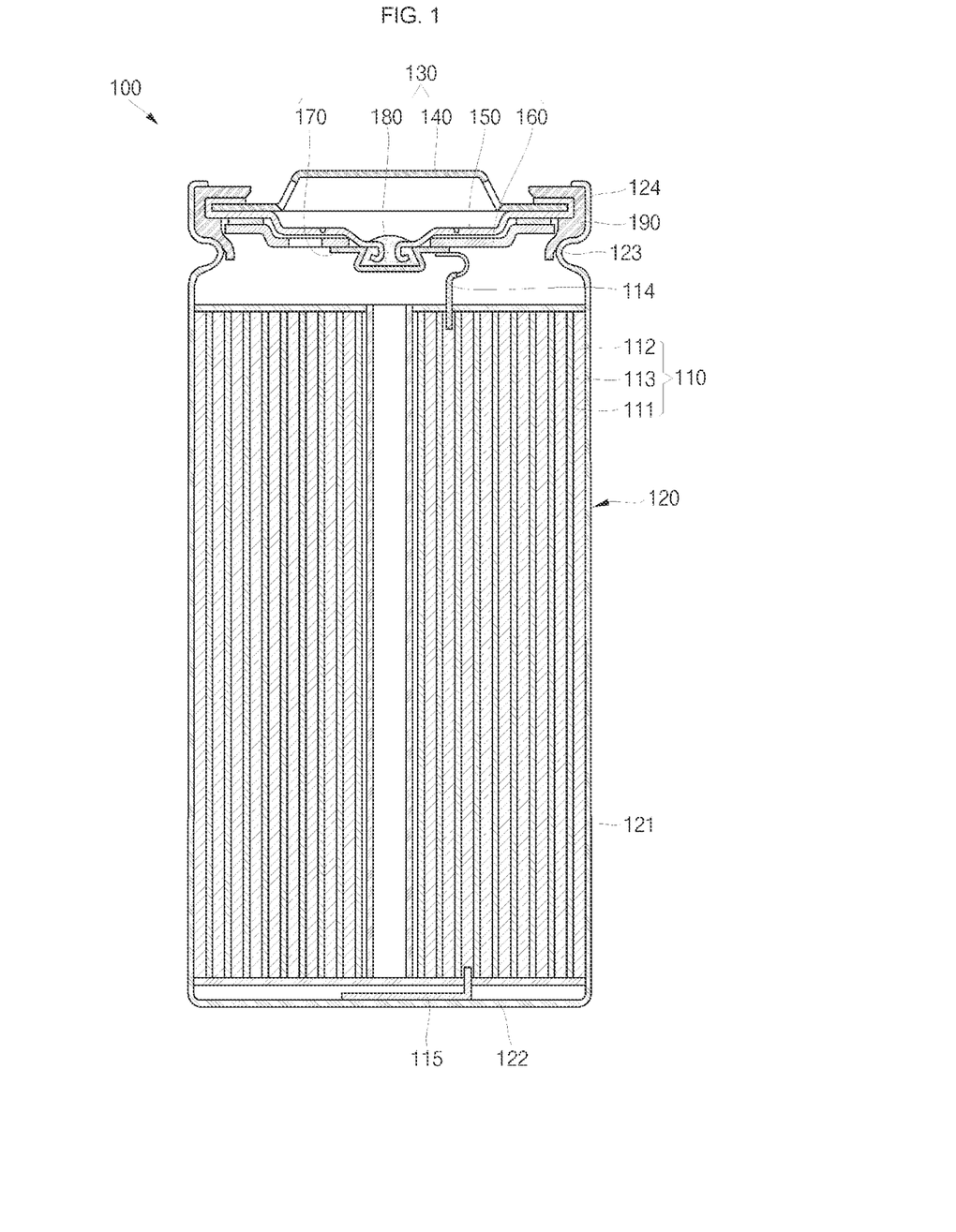
FIG. 1 is a perspective view illustrating a secondary battery according to an embodiment.
Figure 2:
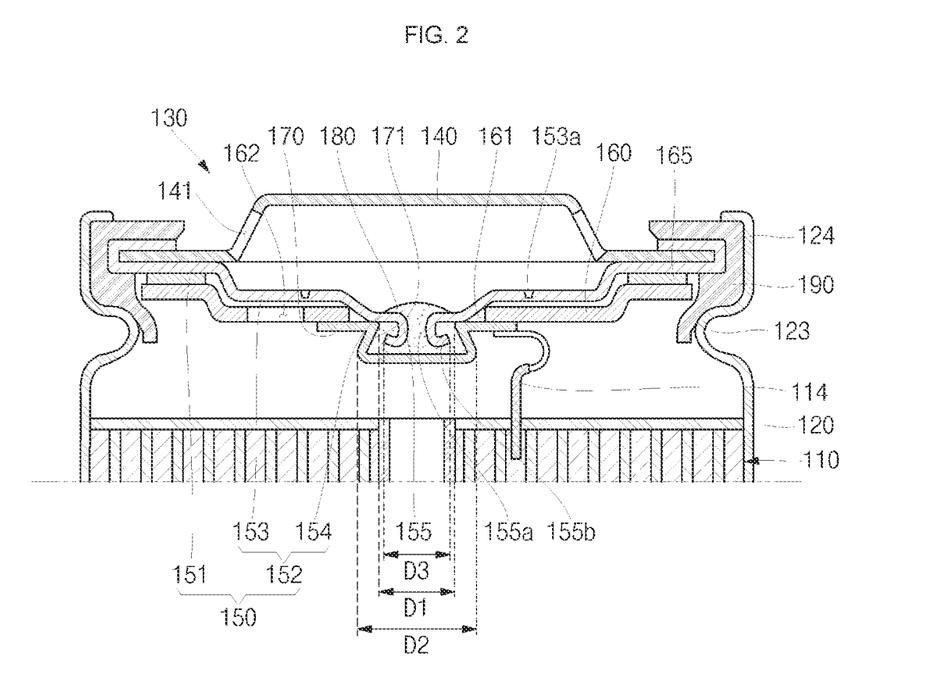
FIG. 2 is a cross-sectional view illustrating a cap assembly in the secondary battery according to an embodiment.
Figure 3:
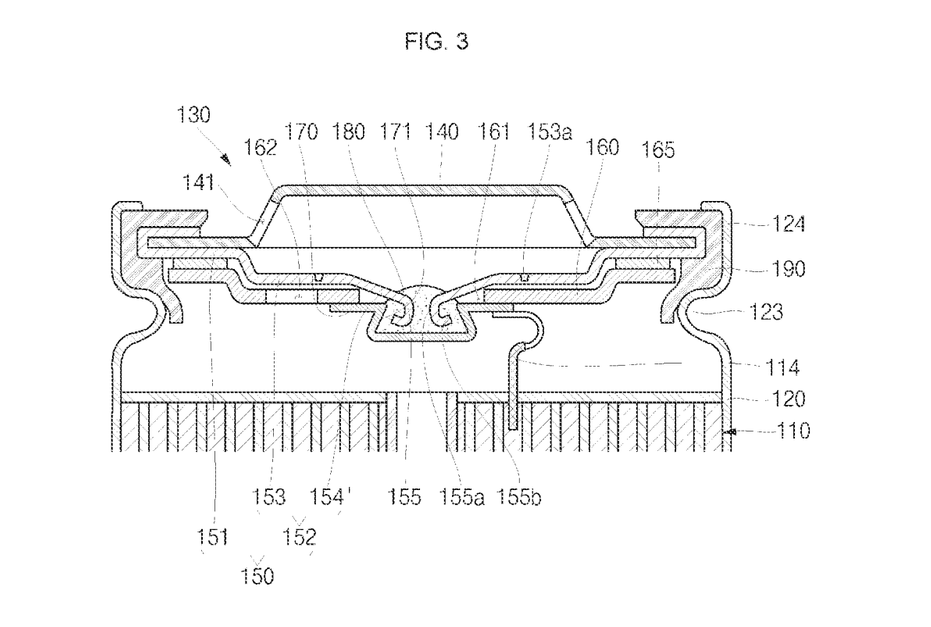
FIG. 3 is a cross-sectional view illustrating another example safety vent.

FIG. 1 is a perspective view illustrating a secondary battery according to an embodiment. FIG. 2 is a cross-sectional view illustrating a cap assembly in the secondary battery according to an embodiment. FIG. 3 is a cross-sectional view illustrating another example safety vent.

Referring to FIGS. 1 and 2, the secondary battery 100 according to an embodiment of the present invention includes an electrode assembly 110, a case 120, a cap assembly 130, and a gasket 190.

The electrode assembly 110 includes a first electrode 111, a second electrode 112, and a separator 113 disposed between the first electrode 111 and the second electrode 112. The electrode assembly 110 may be formed by winding a stacked structure of the first electrode 111, the separator 113 and the second electrode 112 in a jelly-roll configuration. In some embodiments, the first electrode 111 may function as a positive electrode, and the second electrode 112 may function as a negative electrode. A first electrode tab 114 is connected to the cap assembly 130 at a top portion of the electrode assembly 110, and a second electrode tab 115 is connected to a bottom surface plate 122 of the case 120 at a bottom portion of the electrode assembly 110.

The first electrode 111 is formed by coating a first electrode active material, such as a transition metal oxide, on a first electrode current collector formed of a metal foil, such as an aluminum foil. A first electrode uncoated portion without the first electrode active material coated thereon is formed on the first electrode 111, and a first electrode tab 114 is attached to the first electrode uncoated portion. One end of the first electrode tab 114 is electrically connected to the first electrode 111, and the other end of the first electrode tab 114 upwardly protrudes from the electrode assembly 110 and is electrically connected to the cap assembly 130.

The second electrode 112 is formed by coating a second electrode active material, such as graphite or carbon, on a second electrode current collector formed of a metal foil, such as a copper or nickel foil. A second electrode uncoated portion without the second electrode active material coated thereon is formed on the second electrode 112, and a second electrode tab 115 is attached to the second electrode uncoated portion. One end of the second electrode tab 115 is electrically connected to the second electrode 112, and the other end of the second electrode tab 115 downwardly protrudes from the electrode assembly 110 and is electrically connected to the bottom surface plate 122 of the case 120.

The separator 113 is positioned between the first electrode 111 and the second electrode 112 to prevent a short circuit therebetween, and allows lithium ions to move. The separator 113 may include polyethylene, polypropylene, or a composite film of polyethylene and polypropylene.

The case 120 includes a side surface plate 121 having a cylindrically-shaped body having a predetermined diameter forming a space in which the electrode assembly 110 is accommodated, and the bottom surface plate 122 sealing a bottom portion of the side surface plate 121. The top opening of the case 120 is opened to be sealed after the electrode assembly 110 is injected into the case 120. In addition, a beading portion 123 is provided at an upper portion of the case 120 to prevent the electrode assembly 110 from moving. In addition, a crimping portion 124 is provided at a top end of the case 120 to fix the cap assembly 130.

The cap assembly 130 includes a cap-up 140, a safety vent 150, a cap-down 160, a sub-plate 170, and a solder member 180.

The cap-up 140 has an upwardly convex top portion to be electrically connected to an external circuit. In addition, the cap-up 140 has a gas discharge hole 141 providing a passage through which the gases generated inside the case 120 are discharged. The cap-up 140 is electrically connected to the electrode assembly 110 and transfers the current generated in the electrode assembly 110 to the external circuit.

The safety vent 150 is formed as a circular plate body shaped to conform with the cap-up 140 and is installed below the cap-up 140. The safety vent 150 includes a fixing portion 151 positioned at its outer side thereof, and a deforming portion 152 positioned at an inner side of the fixing portion 151 and downwardly protruding. The fixing portion 151 is installed to make close contact with a portion of the cap-up 140, except for an upwardly protruding portion of the cap-up 140, that is, an edge portion of the cap-up 140. In addition, an edge portion of the fixing portion 151 is formed to upwardly extend from the cap-up 140 while covering the edge portion of the cap-up 140. Therefore, the safety vent 150 may be fixed to the cap-up 140 by the fixing portion 151.

The deforming portion 152 includes a first region 153 positioned at its outer side and a second region 154 positioned at an inner side of the first region 153. The deforming portion 152 may be electrically connected to the sub-plate 170 by means of soldering. The deforming portion 152 may be deformed when abnormality occurs to the secondary battery 100, and thus the safety of the secondary battery 100 may be enhanced.

The first region 153 extends from the fixing portion 151 and downwardly protrudes from the inner side of the fixing portion 151. The first region 153 is positioned between the fixing portion 151 and the second region 154. In addition, a notch 153a guiding rupturing of safety vent 150 is provided in the first region 153. In an example embodiment, when the internal pressure of the case 120 exceeds the operating pressure of the safety vent 150, the deforming portion 152 upwardly moves by the gases discharged through the gas discharge hole 162 of the cap-down 160, and thus the safety vent 150 is electrically disconnected from the sub-plate 170. In addition, when the internal pressure of the case 120 exceeds a rupture pressure higher than the operating pressure of the safety vent 150, the notch 153a is broken, thereby preventing the secondary battery 100 from exploding. The safety vent 150 may be made of aluminum (Al).

The second region 154 extends from the first region 153 and downwardly protrudes at the inner side of the first region 153. A coupling portion 155 downwardly protruding from the second region 154 is provided at the center of the second region 154, and a center hole 155a is provided at the center of the coupling portion 155. That is, the coupling portion 155 is formed to have a hollow cylinder shape. In addition, the center hole 155a may provide a space in which the solder member 180 rises upward when the solder member 180 is melted. Additionally, a hook 155b bent toward an outer side of the safety vent 150 is provided at an end of the coupling portion 155. The hook 155b may function to increase a coupling force between the safety vent 150 and the sub-plate 170 to be described later. The coupling portion 155 may be electrically connected to the sub-plate 170 through the solder member 180. As shown in FIG. 2, a portion of the second region 154 is brought into contact with the sub-plate 170, so that the safety vent 150 and the sub-plate 170 are electrically connected to each other. However, a current hardly flows through a contact portion between the second region 154 and the sub-plate 170 due to contact resistance, and the current actually flows between the safety vent 150 and the sub-plate 170 through the solder member 180. In addition, as shown in FIG. 3, a second region 154' may not be brought into contact with the sub-plate 170. Even if the second region 154' is not brought into contact with the sub-plate 170, the safety vent 150 may be electrically connected to the sub-plate 170 through the solder member 180.

Additionally, when the coupling portion 155 is electrically connected to the sub-plate 170, the coupling portion 155 may be coupled to the sub-plate 170 by soldering in a state in which the second region 154 is pressed. Therefore, when a large amount of current flows through the secondary battery 100 due to an external short circuit, the solder member 180 is melted by the heat generated in the secondary battery 100, the second region 154 is upwardly inverted according to the elasticity restored to thus be electrically disconnected from the sub-plate 170.

The cap-down 160 is formed as a circular plate body and is installed below the safety vent 150. A through hole 161 is provided at the center of the cap-down 160, and the second region 154 of the safety vent 150 penetrates the through hole 161. In addition, a gas discharge hole 162 is provided at one side of the cap-down 160. The gas discharge hole 162 may function to discharge internal gases when an excessive internal pressure is generated inside the case 120. Here, the deforming portion 152 of the safety vent 150 may rise due to the gases discharged through the gas discharge hole 162, and thus the safety vent 150 may be separated from the sub-plate 170. In addition, an insulator 165 is provided between the cap-down 160 and the safety vent 150. The insulator 165 insulates the cap-down 160 and the safety vent 150 from each other. The insulator 165 is installed under the fixing portion 151 of the safety vent 150 and is provided as a substantially ring-shaped configuration. The insulator 165 may be made of a resin material such as polyethylene (PE), polypropylene (PP), or polyethylene terephthalate (PET).

The sub-plate 170 is installed below the cap-down 160. Specifically, the sub-plate 170 is coupled to a bottom portion of the cap-down 160 while covering the through hole 161 of the cap-down 160. The sub-plate 170 includes a centrally positioned accommodating groove 171. The coupling portion 155 of the safety vent 150 is accommodated in the accommodating groove 171, and the solder member 180 fills the inside of the accommodating groove 171. The accommodating groove 171 is configured to have a top-end diameter D1 smaller than a bottom-end diameter D2. In other words, the accommodating groove 171 is configured to have diameters gradually increasing away from its top end. In addition, the top-end diameter D1 of the accommodating groove 171 is larger than a diameter D3 of the hook 155b. This is for the purpose of separating the hook 155b of the safety vent 150 from the sub-plate 170 without being caught by the accommodating groove 171 when the solder member 180 filling the accommodating groove 171 is melted due to an external short circuit. The sub-plate 170 is electrically connected to the safety vent 150 through the solder member 180. In addition, the first electrode tab 114 is electrically coupled to the bottom portion of the sub-plate 170. That is, the sub-plate 170 may electrically connect the first electrode tab 114 and the safety vent 150 to each other.

The solder member 180 is accommodated in the accommodating groove 171 of the sub-plate 170, and may electrically connect the coupling portion 155 of the safety vent 150 and the sub-plate 170 by means of soldering. Here, the soldering refers to coupling the safety vent 150 and the sub-plate 170 to each other by melting the solder member 180 by applying heat thereto, and injecting the molten solder member 180 into the accommodating groove 171, followed by curing.

In addition, the solder member 180 is formed to surround the hook 155b of the coupling portion 155, and the hook 155b may prevent the safety vent 150 from being easily separated from the solder member 180. The safety vent 150 may be made of aluminum (Al) and the solder member 180 may include tin (Sn) as a main component, and thus a coupling force between the safety vent 150 and the solder member 180 is relatively weak. For example, if no hook is provided in a coupling portion, a safety vent may be separated from a solder member by a physical force even when the solder member is cured. In the present disclosure, however, since the hook 155b hooks to take hold of the solder member 180, the safety vent 150 is not readily separated from the solder member 180.

The solder member 180 may be made of one selected from the group consisting of Sn—Pb, Sn—Pb—Ag, Sn—Pb—Bi, Sn—Cu, Sn—Ag, Sn—Bi, Sn—Ag—Cu, Sn—Ag—Bi, Sn—Zn, and equivalents thereof. In addition, the solder member 180 may have a melting point ranging from 200° C. to 300° C. As described above, the melting point of the solder member 180 is relatively low, and thus the solder member 180 may be easily melted due to an external short circuit or overcharging when heat is generated in the secondary battery 100. Therefore, the safety vent 150 and the sub-plate 170 coupled to each other by means of soldering are easily separated from each other, thereby enhancing the safety of the secondary battery 100.

The gasket 190 is installed at a top opening of the case 120. That is, the gasket 190 is tightly assembled between each of the outer periphery of the cap-up 140 and the outer periphery of the safety vent 150 and the top opening of the case 120. The gasket 190 may prevent the cap assembly 130 from being separated from the case 120. The gasket 190 may be made of a resin material such as polyethylene (PE), polypropylene (PP), or polyethylene terephthalate (PET).

Next, a method of operating the safety vent in the secondary battery according to an embodiment will be described.

Figure 4:
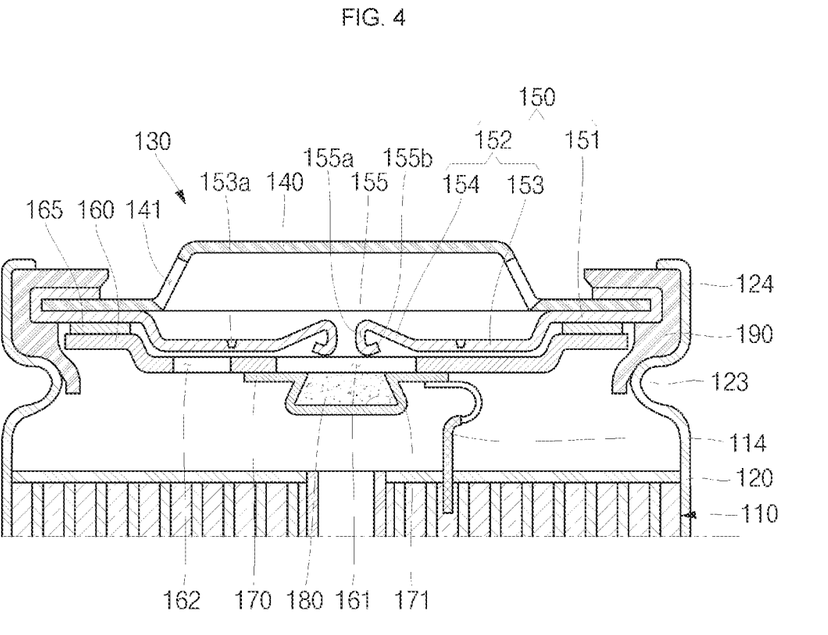
FIG. 4 is a cross-sectional view illustrating an example operation of the safety vent.
Figure 5:
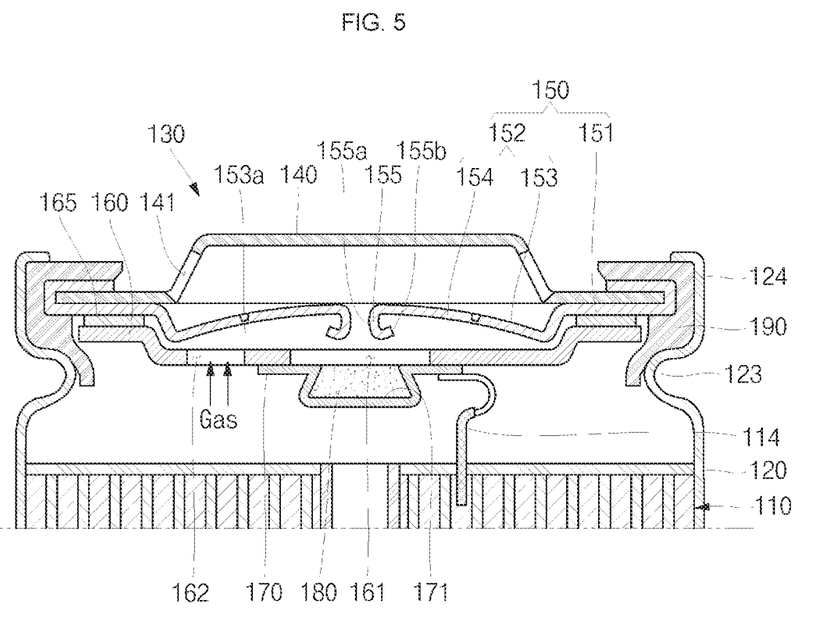
FIG. 5 is a cross-sectional view illustrating another example operation of the safety vent.

FIG. 4 is a cross-sectional view illustrating an example operation of the safety vent. FIG. 5 is a cross-sectional view illustrating another example operation of the safety vent.

First, referring to FIG. 4, an operating state of the safety vent 150 in case of an external short circuit of the secondary battery 100 is illustrated. When the external short circuit occurs to the secondary battery 100, a high current instantaneously flows in the secondary battery 100 and heat is generated. The solder member 180 is melted by the generated heat, and the second region 154 of the safety vent 150 is upwardly inverted, thereby electrically disconnecting the safety vent 150 from the sub-plate 170. As described above, according to the present disclosure, the solder member 180 is melted in case of an external short circuit, and thus the safety vent 150 is disconnected from the sub-plate 170, thereby interrupting the current from flowing in the secondary battery 100. Therefore, the electrode assembly 110 can be prevented from generating heat, thereby enhancing the safety of the secondary battery 100.

Next, referring to FIG. 5, an operating state of the safety vent 150 in case of overcharging of the secondary battery 100 is illustrated. When the overcharging occurs to the secondary battery 100, gases are generated in the secondary battery 100 to increase the internal pressure and the temperature slowly increases. The generated gases pass through the gas discharge hole 162 of the cap-down 160 to push the deforming portion 152, specifically, the first region 153, of the safety vent 150. Here, since the solder member 180 is melted according to the increase in the internal temperature, the second region 154 of the safety vent 150 is also deformed to be upwardly inverted together with the first region 153, thereby electrically disconnecting the safety vent 150 from the sub-plate 170. As described above, according to the present disclosure, the solder member 180 is melted due to the heat and gases generated in case of overcharging, and thus the safety vent 150 is disconnected from the sub-plate 170, thereby interrupting the current from flowing in the secondary battery 100. Therefore, the electrode assembly 110 can be prevented from exploding due to the increase of the internal pressure, thereby enhancing the safety of the secondary battery 100.

Figure 6:
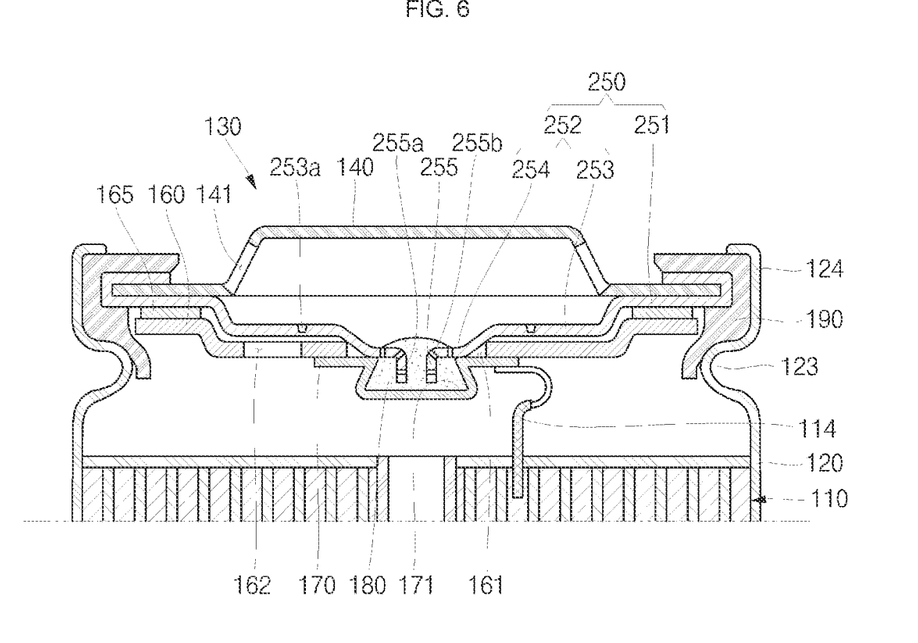
FIG. 6 is a cross-sectional view illustrating a safety vent according to another embodiment.

FIG. 6 is a cross-sectional view illustrating a safety vent according to another embodiment.

Referring to FIG. 6, the safety vent 250 includes a fixing portion 251 positioned at its outer side, and a deforming portion 252 positioned at an inner side of the fixing portion 251 and downwardly protruding. The fixing portion 251 is installed to make close contact with a portion of the cap-up 140, except for an upwardly protruding portion of the cap-up 140, that is, an edge portion of the cap-up 140. In addition, an edge portion of the fixing portion 251 is formed to upwardly extend from the cap-up 140 while covering the edge portion of the cap-up 140. Therefore, the safety vent 250 may be fixed to the cap-up 140 by the fixing portion 251.

The deforming portion 252 includes a first region 253 positioned at its outer side and a second region 254 positioned at an inner side of the first region 253. The deforming portion 252 may be electrically connected to the sub-plate 170 by means of soldering. The deforming portion 252 may be deformed when abnormality occurs to the secondary battery 100, and thus explosion of the secondary battery 100 may be prevented.

The first region 253 extends from the fixing portion 251 and downwardly protrudes from the inner side of the fixing portion 251. The first region 253 is positioned between the fixing portion 251 and the second region 254. In addition, a notch 253a guiding rupturing of the safety vent 250 is provided in the first region 253. In an example embodiment, when the internal pressure of the case 120 exceeds the operating pressure of the safety vent 250, the deforming portion 252 upwardly moves by the gases discharged through the gas discharge hole 162 of the cap-down 160, and thus the safety vent 250 is electrically disconnected from the sub-plate 170. In addition, when the internal pressure of the case 120 exceeds a rupture pressure higher than the operating pressure of the safety vent 250, the notch 253a is broken, thereby preventing the secondary battery 100 from exploding. The safety vent 250 may be made of aluminum (Al).

The second region 254 extends from the first region 253 and downwardly protrudes at the inner side of the first region 253. A coupling portion 255 downwardly protruding from the second region 254 is provided at the center of the second region 254, and a center hole 255a is provided at the center of the coupling portion 255. That is, the coupling portion 255 is formed to have a hollow cylinder shape. The coupling portion 255 may be electrically connected to the sub-plate 170 through the solder member 180. Additionally, a plurality of coupling holes 255b are provided in the second region 254. The coupling holes 255b may function to increase a coupling force between the safety vent 250 and the sub-plate 170. Specifically, when the coupling portion 255 is coupled to the sub-plate 170 by means of soldering, the solder member 180 is injected into coupling holes 255b and then cured. Therefore, since the solder member 180 penetrating the coupling holes 255b takes hold of the second region 254, the safety vent 250 is not readily separated from the solder member 180.

While the foregoing embodiment has been described to practice the secondary battery of the present invention, it will be understood by those of ordinary skill in the art that various changes in form and details may be made therein without departing from the spirit and scope of the present invention as defined by the following claims.

The invention claimed is:

1. A secondary battery comprising:
    an electrode assembly;
    a case for accommodating the electrode assembly; and
    a cap assembly coupled to the top of the case,
    wherein the cap assembly comprises a cap-up, a safety vent provided below the cap-up, a cap-down provided below the safety vent and having a through hole and a gas discharge hole, an insulator provided between the safety vent and the cap-down, a sub-plate provided below the cap-down, and a solder member for electrically connecting the safety vent and the sub-plate, and the safety vent and the sub-plate are electrically connected by means of soldering,
    wherein the safety vent having a coupling portion, that is electrically connected to the sub-plate through the solder member, and a center hole is provided at a center of the coupling portion, and
    wherein the sub-plate includes an accommodating groove located to correspond to the through hole of the cap-down, and the coupling portion and the solder member are accommodated in the accommodating groove,
    wherein a lower end of the accommodating groove is spaced apart from the coupling portion.

2. The secondary battery of claim 1, wherein the safety vent includes a fixing portion installed to make close contact with an edge portion of the cap-up, and a deforming portion positioned at an inner side of the fixing portion and downwardly protruding, and the deforming portion includes a first region extending from the fixing portion and having a notch formed therein, and a second region positioned at an inner side of the first region, having the coupling portion having the center hole formed therein, and downwardly protruding.

3. The secondary battery of claim 1, wherein the accommodating groove is configured to have a top-end diameter smaller than a bottom-end diameter.

4. The secondary battery of claim 1, wherein a hook bent toward an outer side of the safety vent is provided at an end of the coupling portion.

5. The secondary battery of claim 4, wherein the hook has a diameter smaller than the top-end diameter of the accommodating groove.

6. The secondary battery of claim 2, wherein a plurality of coupling holes are provided in the second region, and the solder member is injected into the coupling holes.

7. The secondary battery of claim 1, wherein the solder member has a melting point ranging from 200° C. to 300° C.

8. The secondary battery of claim 1, wherein when an external short circuit occurs to the secondary battery, the solder member is melted and the safety vent is upwardly convexly deformed, so that the safety vent is disconnected from the sub-plate.

9. The secondary battery of claim 1, wherein when the internal pressure of the secondary battery is greater than or equal to an operating pressure of the safety vent, the solder member is melted and the safety vent is upwardly convexly deformed, so that the safety vent is disconnected from the sub-plate.

* * * * *